(12) United States Patent
Bennett

(10) Patent No.: US 10,264,921 B2
(45) Date of Patent: Apr. 23, 2019

(54) COOKWARE LID WITH BASTING PROJECTIONS

(71) Applicant: TUESDAY MORNING PARTNERS, LTD., Dallas, TX (US)

(72) Inventor: Timothy J. Bennett, Colorado Springs, CO (US)

(73) Assignee: TUESDAY MORNING PARTNERS, LTD., Dallas, TX (US)

( * ) Notice: Subject to any disclaimer, the term of this patent is extended or adjusted under 35 U.S.C. 154(b) by 435 days.

(21) Appl. No.: 14/978,012

(22) Filed: Dec. 22, 2015

(65) Prior Publication Data

US 2017/0172345 A1    Jun. 22, 2017

(51) Int. Cl.
*A47J 37/10* (2006.01)
*A47J 36/06* (2006.01)

(52) U.S. Cl.
CPC .......... *A47J 37/106* (2013.01); *A47J 36/06* (2013.01); *A47J 37/101* (2013.01)

(58) Field of Classification Search
CPC ............. A47J 27/00; A47J 36/34; A47J 36/06
USPC ........... 99/347, 346; 126/381.1, 384.1, 386.1
See application file for complete search history.

(56) References Cited

U.S. PATENT DOCUMENTS

| | | |
|---|---|---|
| 534,138 A | 2/1895 | Cleary |
| 626,808 A | 6/1899 | Gurney |
| 761,498 A | 5/1904 | Kampfe |
| 1,039,140 A | 9/1912 | Kampfe |
| 1,341,731 A | 6/1920 | Berger |
| 1,349,302 A | 8/1920 | Spitz |
| 1,414,540 A | 5/1922 | Young |
| 1,461,366 A | 7/1923 | Mulford et al. |

(Continued)

FOREIGN PATENT DOCUMENTS

| | | |
|---|---|---|
| CN | 103622559 A | 3/2014 |
| EP | 1056380 B1 | 10/2004 |

(Continued)

OTHER PUBLICATIONS

"Staub 5 Quart Round Cocotte, Grenadine," printed from http://www.amazon.com/Staub-Quart-Round-Cocotte-Grenadine/dp/B000KLZ0FE, publicly available at least as early as Jan. 6, 2007 (8 pages).

(Continued)

*Primary Examiner* — Ibrahime A Abraham
*Assistant Examiner* — Gyounghyun Bae
(74) *Attorney, Agent, or Firm* — Haynes and Boone LLP

(57) ABSTRACT

A cookware assembly comprises a lid including an underside and a plurality of basting projections. The underside has a center and extending toward a perimeter of the lid. Each of the plurality of basting projections protrudes downwardly from the underside of the lid. Each of the plurality of basting projections includes an interior concave surface, an exterior concave surface, and a drip ridge. The interior concave surface extends downwardly away from the underside to form a bay adjacent to the interior concave surface. The drip ridge is formed along a border between the interior concave surface and the exterior surface and defines a vertex along the drip ridge. During use of the lid, condensate formed on the underside collects along the interior concave surface, which funnels the condensate to the vertex for droplet formation and release from a corresponding one of the plurality of basting projections.

18 Claims, 11 Drawing Sheets

(56) References Cited

U.S. PATENT DOCUMENTS

| | | | |
|---|---|---|---|
| 1,777,743 A | 10/1930 | Blenz | |
| 1,810,860 A | 6/1931 | Tremblay | |
| 1,852,628 A | 4/1932 | Robinson | |
| 2,002,237 A | 5/1935 | Roland | |
| 2,127,988 A | 8/1938 | Tarrant | |
| 2,348,452 A | 5/1944 | Christopher | |
| 2,511,682 A | 6/1950 | Allen | |
| 2,573,719 A | 11/1951 | Lebherz | |
| 2,609,960 A | 9/1952 | Irwin | |
| 2,636,636 A | 4/1953 | Smith | |
| 2,643,024 A | 6/1953 | Cronheim | |
| 2,696,816 A | 12/1954 | Barber et al. | |
| 2,751,901 A | 6/1956 | Livermore | |
| 2,760,672 A | 8/1956 | Cronheim | |
| 3,465,745 A | 9/1969 | Butler | |
| 3,700,853 A * | 10/1972 | Jensen | A45D 4/10 126/20 |
| 3,780,642 A * | 12/1973 | Bay | A47J 36/04 126/381.1 |
| 4,091,956 A * | 5/1978 | Vecchio | A47J 36/06 126/384.1 |
| 4,298,131 A | 11/1981 | Saito et al. | |
| 4,351,164 A * | 9/1982 | Christiani | A47G 19/02 220/23.83 |
| 4,482,077 A * | 11/1984 | Henderson | A47J 36/06 126/299 C |
| 5,555,994 A | 9/1996 | Chen | |
| D412,810 S * | 8/1999 | Alfred | D7/391 |
| 6,053,095 A | 4/2000 | Ting | |
| 6,279,568 B1 | 8/2001 | Anthony | |
| 6,848,592 B2 | 2/2005 | Logiudice | |
| 7,073,498 B2 | 7/2006 | Howell et al. | |
| D572,523 S * | 7/2008 | Baker | D7/360 |
| 7,594,591 B2 * | 9/2009 | Gnatenko | A47J 36/06 220/366.1 |
| 8,181,640 B2 * | 5/2012 | Park | A47J 27/00 126/220 |
| 8,519,308 B2 | 8/2013 | Ferrari et al. | |
| 8,820,563 B2 | 9/2014 | Gaumann | |
| 8,881,644 B1 | 11/2014 | Scro, II | |
| D720,571 S | 1/2015 | Deters | |
| 8,939,287 B2 * | 1/2015 | Markovitch | A61L 2/26 206/363 |
| D732,880 S | 6/2015 | Accoceberry et al. | |
| D732,881 S | 6/2015 | Accoceberry et al. | |
| D732,882 S | 6/2015 | Accoceberry et al. | |
| D732,883 S | 6/2015 | Accoceberry et al. | |
| D732,884 S | 6/2015 | Accoceberry et al. | |
| D732,885 S | 6/2015 | Accoceberry et al. | |
| 9,301,643 B2 * | 4/2016 | Mader | A47J 37/101 |
| 2006/0196877 A1 | 9/2006 | Droese | |
| 2014/0053824 A1 | 2/2014 | Mader | |

FOREIGN PATENT DOCUMENTS

| | | |
|---|---|---|
| EP | 2700341 A1 | 2/2014 |
| WO | 2005079643 A1 | 9/2005 |
| WO | 2008052723 A3 | 3/2008 |
| WO | 2013010555 A1 | 1/2013 |
| WO | 2013175159 A1 | 11/2013 |

OTHER PUBLICATIONS

"Tramontina 6.5 Qt Enameled Round Cast Iron Dutch Oven," printed from http://www.walmart.com/ip/Tramontina-6.5-Qt-Enameled-Round-Cast-Iron-Dutch-Oven/29114481, publicly available at least as early as Oct. 28, 2009 (9 pages).

"Staub Enameled Cast Iron Cookware," printed from http://staub.125west.com/, publicly available at least as early as Aug. 24, 2010, per http://web.archive.org (3 pages).

"Color Cast 2.6-Quart Round Roaster/Casserole with a Special Self Basting Lid," printed from http://wowshopper.com/small-appliances/cookware-color-cast-cookware.htm, publicly available at least as early as Nov. 3, 2011, per http://web.archive.org (3 pages).

"Fontignac 8 1/2-quart Cast Iron Oval Dutch Ovens," printed from http://www.cutleryandmore.com/fontignac/cast-iron-oval-dutch-oven-p125427, publicly available at least as early as Jul. 25, 2012, per http://web.archive.org (3 pages).

"Staub-Chistera Saute Pans," printed from http://berondi.de/staub-cookware/staub-chistera-saute-pans.html?_from_store=default&_store=berondi_en&mode=list, publicly available at least as early as Apr. 14, 2015 (4 pages).

U.S. Appl. No. 29/549,460, filed Dec. 22, 2015 (39 pages).

* cited by examiner

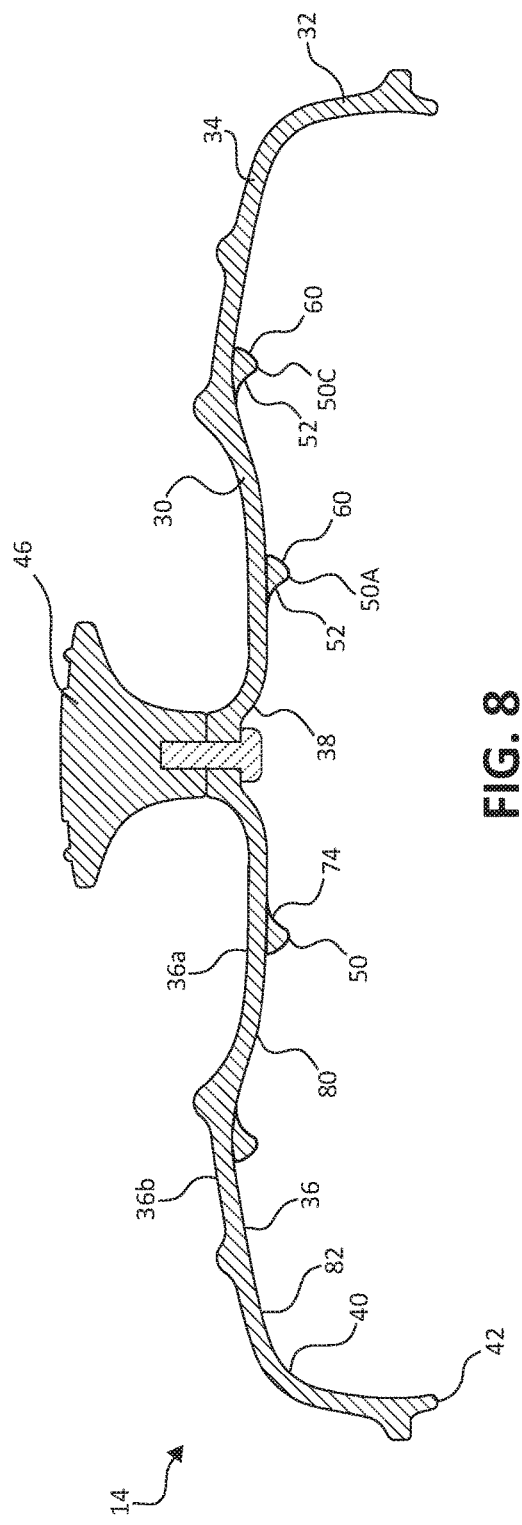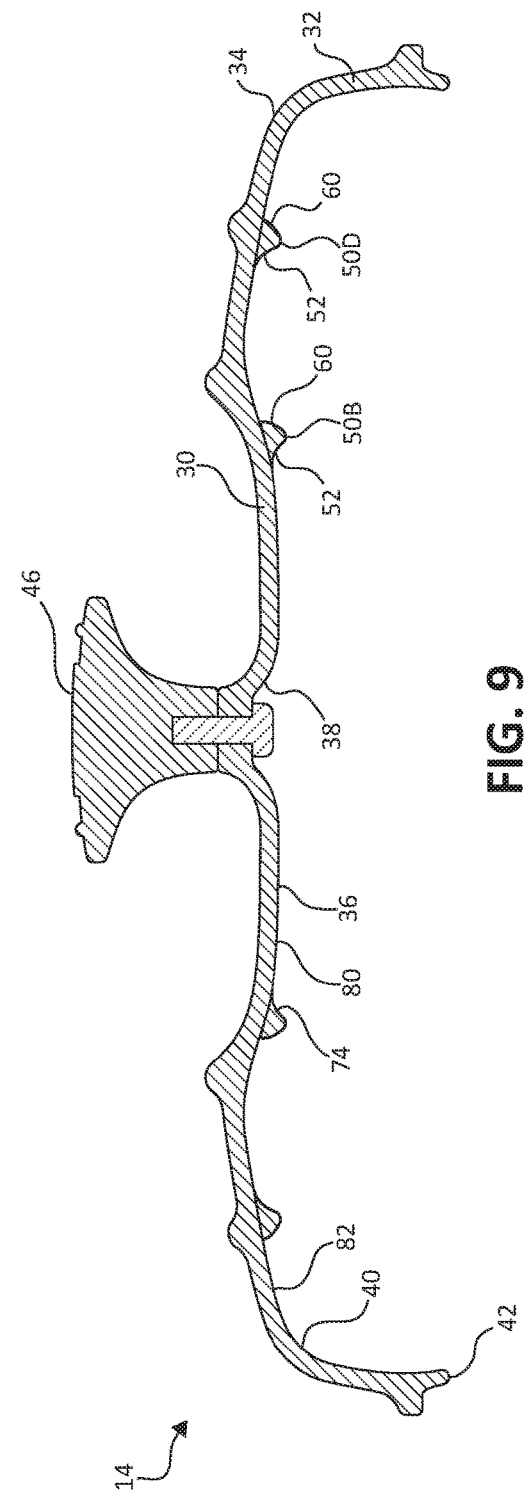

COOKWARE LID WITH BASTING PROJECTIONS

CROSS-REFERENCE TO RELATED APPLICATION

This application is related to U.S. patent application Ser. No. 29/549,460, entitled "Cookware Cover," filed Dec. 22, 2015.

BACKGROUND

Braising is a manner of cooking food that uses heat, time, and moisture to tenderize food and/or mingle flavors of food commonly cooked in a single covered pan. Braising is a particularly popular way to cook relatively tough cuts of meat by breaking down connective meat tissue to produce a tender end product. The meat and accompanying foods are typically placed in a pot, liquid is optionally added to the foods, the pot is covered, and cooked at a very low heat until the meat becomes tender. The added liquid and/or liquid released from the other foods placed in the pot and rises as vapor, subsequently condensing on the underside of the lid. For typical curved lids, the condensed liquid travels along the lid curvature to the edge of the lid. When liquid droplets meet the edge of the lid, they drip off or move downwardly into the pot along the pot sidewalls. Where a lid is flat or just slightly curved, random drops of liquid collect and fall down to the food in the pot in an uneven and largely random fashion. While the falling moisture keeps the food within the pot moist, the irregular falling of moisture onto the food creates an uneven cooked product.

SUMMARY

One aspect of the present invention relates to a cookware assembly comprising a lid including an underside and a plurality of basting projections. The underside has a center and extending toward a perimeter of the lid. Each of the plurality of basting projections protrudes downwardly from the underside of the lid. Each of the plurality of basting projections includes an interior concave surface, an exterior concave surface, and a drip ridge. The interior concave surface extends downwardly away from the underside to form a bay adjacent to the interior concave surface. The exterior surface extends downwardly away from the underside of the lid to border with the interior surface opposite the underside, and the exterior surface faces the perimeter of the lid. The drip ridge is formed along a border between the interior concave surface and the exterior surface and defines a vertex at a point along the drip ridge positioned the farthest from the underside as compared to a remainder of the drip ridge. During use of the lid, condensate formed on the underside collects along the interior concave surface, which funnels the condensate to the vertex for droplet formation and release from a corresponding one of the plurality of basting projections. The details of one or more implementations are set forth in the accompanying drawings and description below. Other features, objects, and advantages will be apparent from the description and drawings, and from the claims.

BRIEF DESCRIPTION OF THE DRAWINGS

Embodiments of the invention will be described with respect to the figures, in which like reference numerals denote like elements, and in which:

FIG. 8 is a cross-sectional view illustration of the lid taken along the line Y-Y in FIG. 4 showing only portions of the lid directly adjacent the line Y-Y, according to one embodiment of the present invention.

FIG. 9 is a cross-sectional view illustration of the lid taken along the line Z-Z in FIG. 4 showing only portions of the lid directly adjacent the line Z-Z, according to one embodiment of the present invention.

DETAILED DESCRIPTION

The following detailed description of the invention provides example embodiments and is not intended to limit the invention or the application and uses of the invention. Furthermore, there is no intention to be bound by any theory presented in the preceding background of the invention or the following detailed description of the invention. Relational terms herein such a first, second, top, bottom, etc. may be used herein solely to distinguish one entity or action from another without necessarily requiring or implying an actual such relationship or order. In addition, as used herein, the term "about" or "substantially" apply to all numeric values or descriptive terms, respectively, and generally indicate a range of numbers or characteristics that one of skill n the art would consider equivalent to the recited values or terms, that is, having the same function or results.

The current invention relates to a cookware lid with basting projections and a cookware assembly incorporating the cookware lid. In particular, the cookware lid includes a plurality of projections extending downwardly from an underside of the cookware lid. When the lid is placed on a cookware vessel and cooked with one or more moist articles contained therein, moisture vaporizes and rises to the underside of the cookware lid, where the vapor condenses into moisture. The configuration of the underside and/or the arrangement of the plurality of projections collects the condensate to the plurality of projections, which in turn gathers the collect condensate into droplets for release down to food maintained within the cookware vessel.

Figure 1:
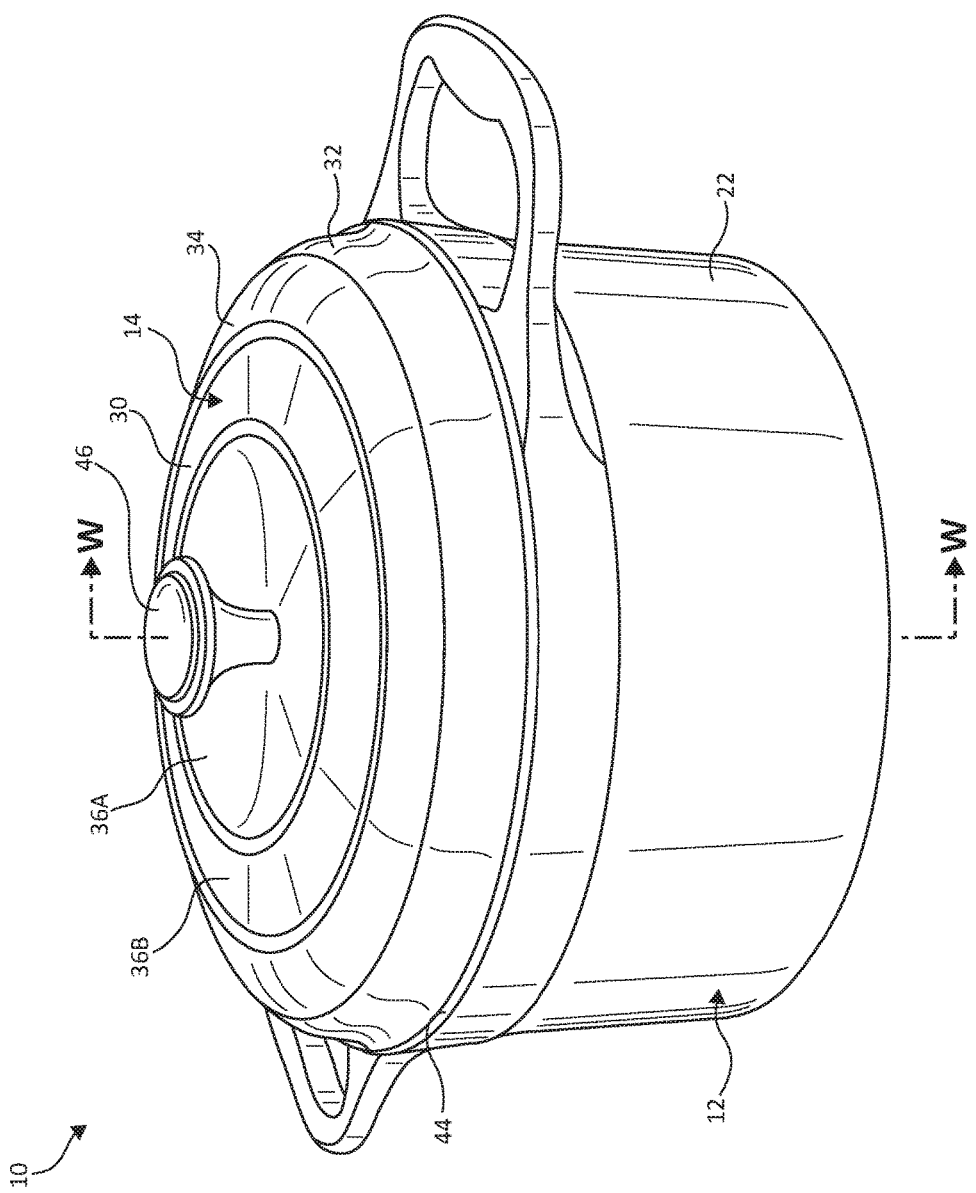
FIG. 1 is a top perspective view illustration of a cookware assembly including a vessel and a lid, according to one embodiment of the present invention.
Figure 2:
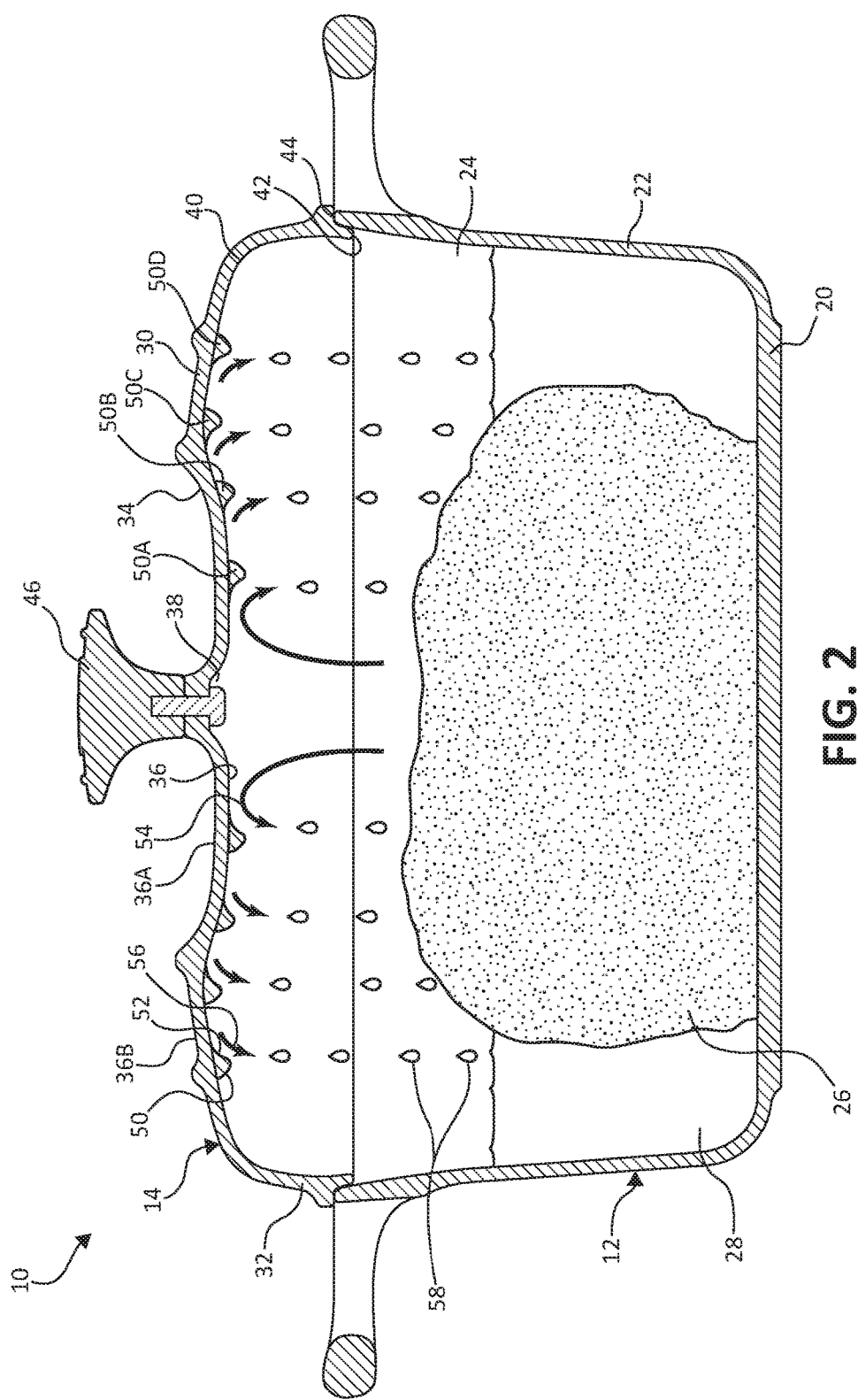
FIG. 2 is a cross-sectional view illustration taken along the line W-W in FIG. 1 with schematic illustration of moisture travel during use, according to one embodiment of the present invention.

In one embodiment, each of the plurality of projections is configured to collect condensate from either side thereof and funnel the condensate into a discrete droplet release point at a vertex of each projection. In one example, the plurality of projections are spaced from one another such that the drops are distributed substantially evenly over an area below the underside of the lid and, therefore, over the food and liquid cooking in that area. In this manner, collected moisture is re-released to the cooking items in a distributed manner, not just at edges thereof, continuously and more evening basting the cooking item below Turning to the figures, FIG. 1 illustrates a cookware assembly 10 including a vessel 12, such as a pot, and a cover or lid 14 selectively covering vessel 12, and FIG. 2 illustrates a cross-sectional view and schematic illustration of moisture movement therein. Vessel 12 includes a bottom 20, sidewall 22 extending upwardly from and around an outer perimeter of bottom 20 to define a chamber 24 therein. In one example, during use, a food item 26, such as meat, vegetable, or combination thereof, is maintained in chamber 24 with juices or other liquid 28 surrounding the food item 26. Lid 14 is configured to interface with sidewall 22 opposite bottom 20 to enclose and, in one embodiment, tightly fit with vessel 12 to generally prevent escape of liquid vapors from chamber 24. In one example, vessel 12 and/or lid 14 are both made of glass, cast iron, or other suitable material.

Figure 3:
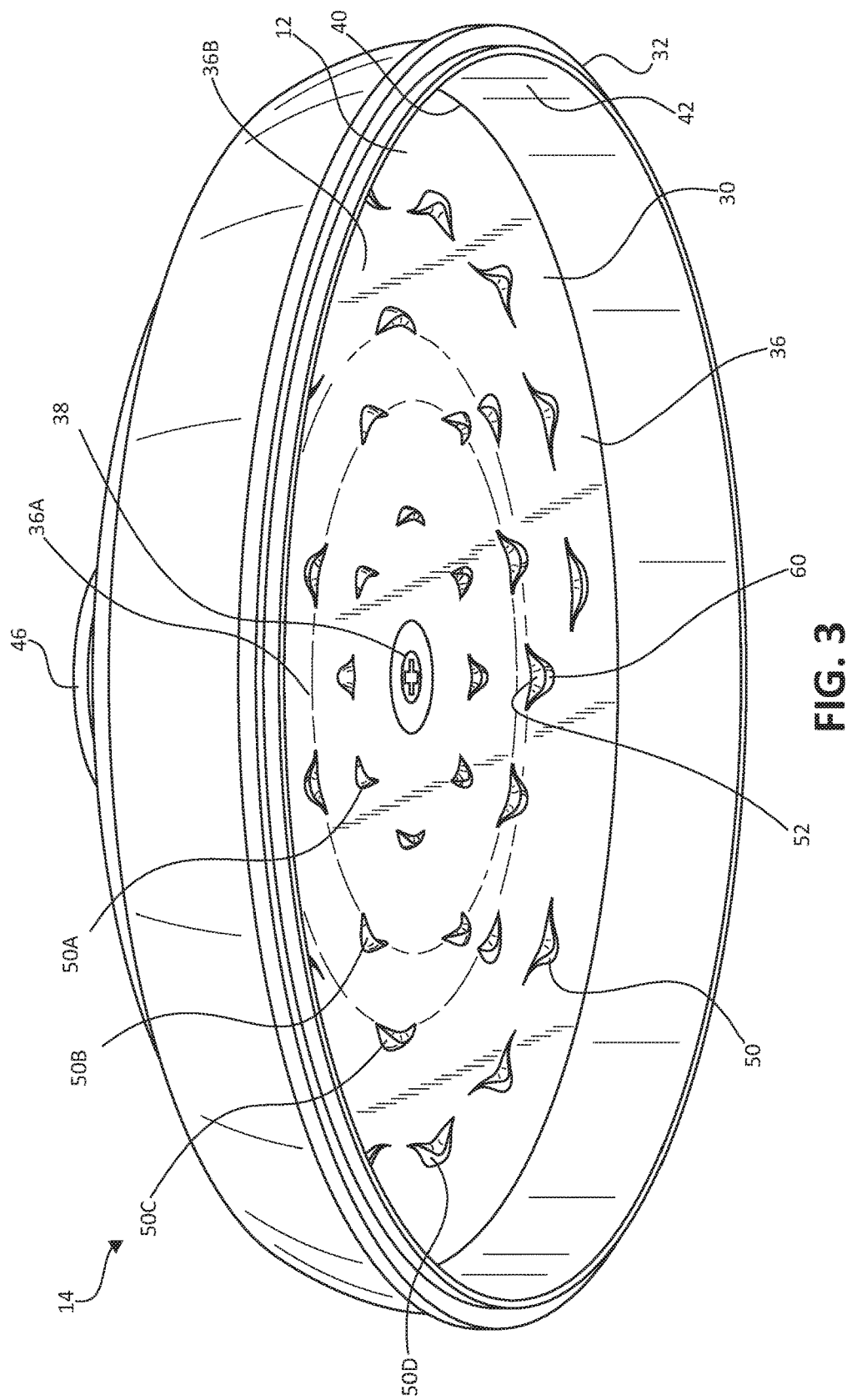
FIG. 3 is a bottom perspective view illustration of the lid from FIG. 1, according to one embodiment of the present invention.
Figure 4:
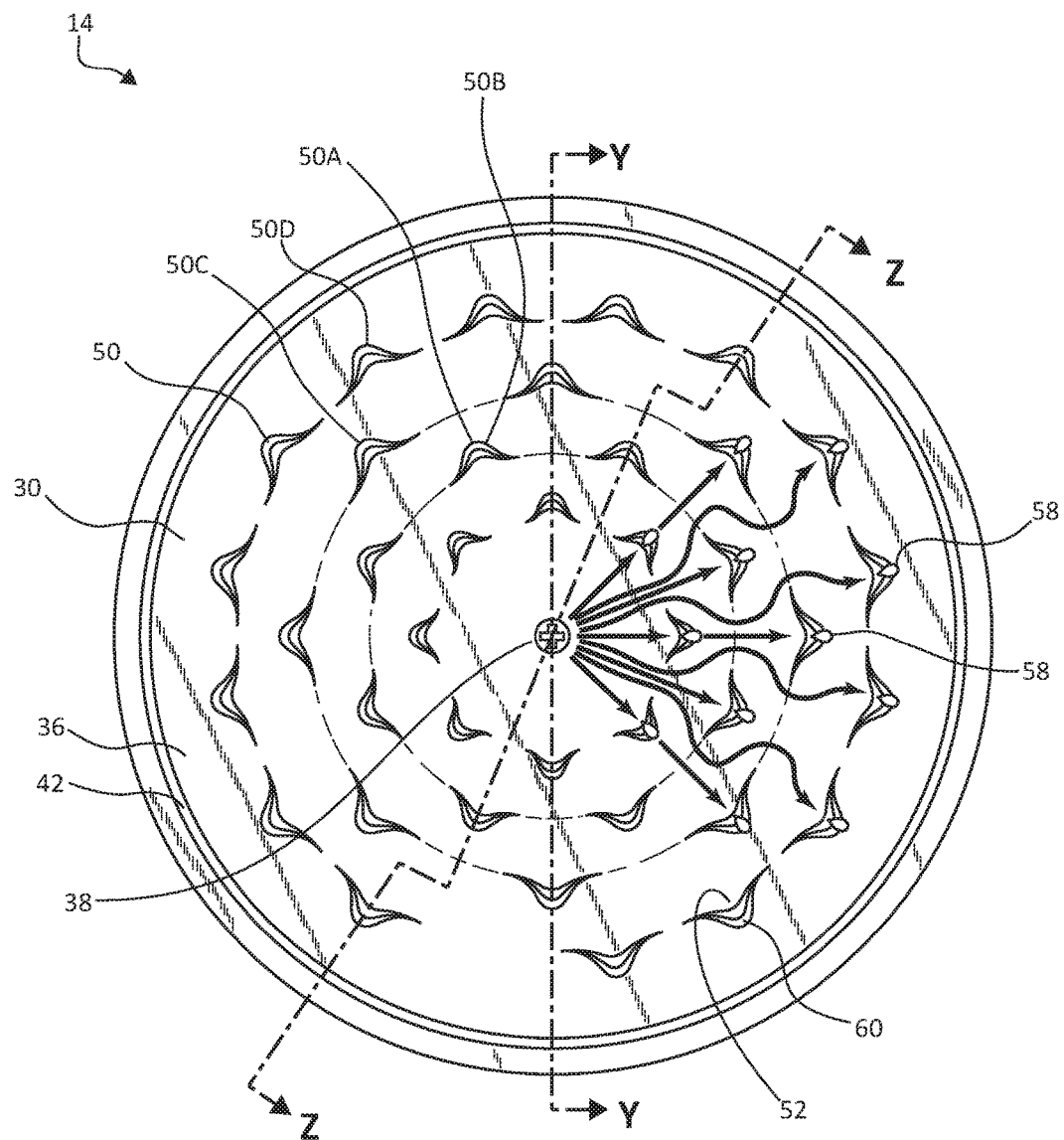
FIG. 4 is a bottom view illustration of the lid of FIG. 1, according to one embodiment of the present invention.

Additionally referring to the bottom perspective view of FIG. 3 and the bottom view of FIG. 4, lid 14 includes a primary panel or portion 30 and a sidewall 32 depending downwardly from an outside perimeter of primary portion 30, according to one embodiment. Primary portion 30 defines an exterior surface 34 and an underside 36 opposite exterior surface 34 such that the underside 36 faces vessel 12 during use of cookware assembly 10. Underside 36, or at least portions thereof, generally angles downwardly as it extends away from a center 38 of primary portion 30 toward a perimeter 40 of primary portion 30. In one example, underside 36 extends in a consistent downward angle as underside 36 radially extends outwardly between center 38 and primary portion 30. In another example, as illustrated, for example in FIGS. 2, 8, and 9, underside 36 includes a depressed center section 36A and a raised outer section 36B concentrically extending around depressed center section 36A. Both depressed center section 36A and raised outer section 36B have at least a slightly downwardly extending angle as they radially extend away from center 38 toward perimeter 40 of primary portion 30 in a manner encouraging condensate to generally move away from center 38 toward perimeter 40 of lid 14 during use as will be further described below.

Sidewall 32 extends downwardly from perimeter 40 of primary portion 30 to a sidewall edge 42. During use with vessel 12, sidewall edge 42 interfaces with vessel 12 near a top edge 44 of vessel 12 in a manner configured to maintain heat and moisture within chamber 24 during use of cookware assembly 10. In one example, lid 14 additionally includes one or more handle 46, such as a knob-type handle 46 extending upwardly from center 38 of lid 14 and/or side extending handles (not shown) extending radially outwardly from sidewall 32 of lid 14. Handle 46 may be integrally formed as a single piece with a remainder of lid 14 or formed separated and secured to a remainder of handle 46.

Lid 14 includes a plurality of basting projections 50 or other self-basting features spaced from each other and each extending downwardly from underside 36 of lid 14. In one example, each basting projection 50 is formed as a peaked three-dimensional shape. Each basting projection 50 is configured to receive moisture condensation from liquid 28 and/or food item 26 in chamber 24 of vessel 12, as generally indicated by arrow 54 in FIG. 2, to underside 36 and to redirect the path of such moisture as will be described in additional detail below. In one embodiment, basting projections 50 are integrally formed with a remainder of lid 14, for example, by being molded or otherwise formed as a single member therewith, of glass and/or cast iron.

Figure 5:
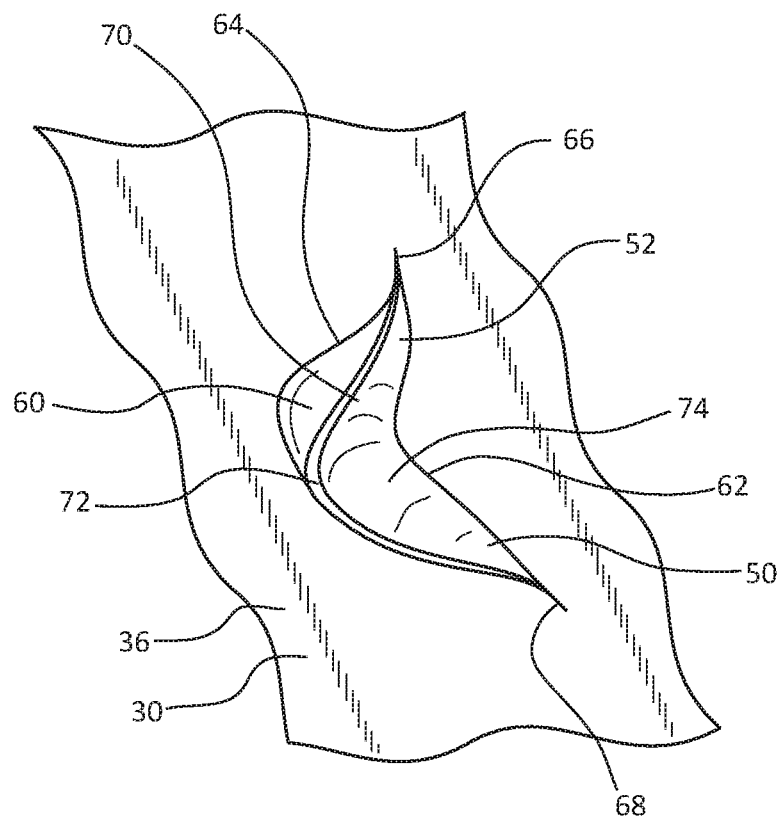
FIG. 5 is an enlarged, detail view illustration of a portion of the lid of FIG. 3 including one underside basting projections, according to one embodiment of the present invention.

Each basting projection 50 includes a center facing or interior surface 52 and a perimeter-facing or exterior surface 60 opposite interior surface 52. As illustrated with additional reference to the detailed view of FIG. 5 and the cross-sectional view of FIG. 6, interior surface 52 intersects underside 36 along a top interior line 62 and extends downwardly therefrom with a substantially tented and/or generally parabolic overall shape. Top interior line 62 is curvilinear along underside 36, for example parabolic in shape, bowing toward perimeter 40. In one example, interior surface 52 is concave, bowing toward perimeter 40, in its extension below top interior line 62 forming a indentation, recess, or bay 74 for collecting moisture therein as illustrated with primary reference to FIGS. 5 and 6. The bay 74 resulting from the curvature of top interior line 62 and concavity of interior surface 52 provides additional surface area for supporting condensate of interior surface 52 as compared to a straight and planar surface. The additional surface area of interior surface 52, in one example, thereby allows for an increased amount of moisture to be collected into a moisture droplet 58 via surface tension before such moisture droplets 58 are released down into chamber 24 of vessel 12.

Figure 6:
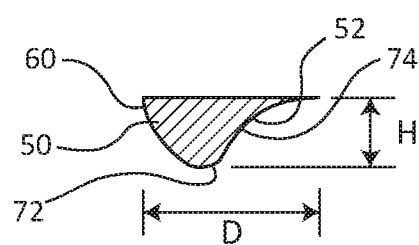
FIG. 6 is a center a cross sectional view illustration of the underside basting projection of FIG. 5, according to one embodiment of the present invention.

In one example, each basting projection 50 further includes a perimeter-facing or exterior surface 60 opposite interior surface 52. Each exterior surface 60 intersects underside 36 along a top exterior line 64 and extends downwardly therefrom. Top exterior line 64 is curvilinear, for example, bowing toward perimeter with a substantially parabolic shape having a greater degree of curvature than top interior line 62. Exterior surface 60 is generally convex bowing toward perimeter 40. In one example, the convex nature of exterior surface 60 serves to prevent or at least decrease the amount of condensate from moving up exterior surface 60 even when lid 14 is moved or tilted. In one embodiment, top interior line 62 and top exterior line 64 intersect at opposing ends 66 and 68 thereof, which in one example, are each located along a common circumference or circular ring $C_A$, $C_B$, $C_C$, or $C_D$ as shown in the simplified view of FIG. 7. Each of top interior line 62 and top exterior line 64 curves radially outwardly from opposing ends 66 and 68 toward perimeter 40 of lid 14. Top interior line 62 is radially inset from top exterior line 64 by way of top interior line 62 having a lesser degree of curvature than top exterior line 64. An overall depth D of each basting projection 50 is defined between a centermost point of top interior line 62 and a point of top exterior line 64 closest to perimeter 40 of lid 14, as illustrated in FIG. 6. In one example, all basting projections 50 have substantially identical overall depths D.

In one example, overall depth D is equal to at least 5 mm, and in one embodiment, about 10 mm or more.

Each of interior surface 52 and exterior surface 60 extend from the corresponding one of top interior line 62 or top exterior line 64 to border or intersect each other along a drip line or ridge 70 also referred to a drip edge. In one embodiment, drip ridge 70 has a parabolic shape extending progressively further away from underside 36 as drip ridge 70 extends away from opposing ends 66 and 68. According to one example, drip ridge 70 defines a peak or vertex 72, which serves as a discrete droplet release point, at the lowermost point of drip ridge, that is at the farthest point of drip ridge 70 away from underside 36. In general, the center cross-sectional shape of each basting projection 50 decreases or tapers in depth as the basting projection 50 extends from underside 36 to f 72. In one example, each basting projection 50 is substantially symmetrical about a mid-line (not shown) that intersects vertex 72 about half way between opposing ends 66 and 68 such that condensate from both sides of vertex 72 are collected and moved toward vertex 72 due to gravitational forces and design of lid 14. In this manner, vertex 72 is substantially centered along drip ridge 70 between opposing ends 66 and 68. In one embodiment, basting projection 50 is solid between interior surface 52 and exterior surface 60 and between underside 36 and vertex 72.

In view of the example basting projection 50 with a cupped shape of bay 74 as described above, each basting projection 50 is configured to collect moisture along interior surface 52 thereof, for instance, within bay 74, and to redirect said moisture back into chamber 24 of vessel 12. More specifically, additionally referring to FIG. 2, during cooking, moisture evaporates from liquid 28 and/or food item 26 rising within vessel 12 per moisture arrow 56 to contact underside 36 of lid 14. Upon moisture vapors 56 contacting underside 36, they condense becoming moisture drops or balls due to surface tension between moisture molecules. The condensed moisture moves outwardly toward perimeter 40 due to a slope of underside 36 being collected within a nearby bay 74 of one of basting projections 50 as illustrated for example, with reference to the directional arrows of FIG. 4.

In turn, via the continued influence of gravitational forces, moisture in bay 74 slides along interior surface 52 of basting projection 50 to vertex 72. The moisture continues to collect along interior surface 52 and, more specifically, vertex 72, forming a moisture droplet 58 due to surface tension between the moisture molecules. As the moisture continues to collect, a size of moisture droplet 58 grows until moisture droplet 58 has a sufficient weight to overcome any surface tension previously holding moisture droplet 58 to basting projection 50. When the surface tension is counteracted, moisture droplet 58 is released from basting projection at vertex 72, dropping substantially vertically back down to food item 26 and/or liquid 28 maintained in vessel 12 immediately below, as generally indicated by moisture arrows 56 in FIG. 2.

In order to collect moisture from underside 36 in a consistent manner and to release moisture droplets 58 back to food item 26 and liquid 28 below in an evenly distributed manner for more even and consistent braising of food item 26 below, in one embodiment, the plurality of basting projections 50 are arranged in a plurality of concentrically positioned circular arrays all having similarly shaped, but differently sized basting projections 50. As illustrated, for example, with reference to FIGS. 4 and 7, lid 14 is shown with four circular arrays of basting projections 50, and each circular array includes a plurality of basting projections 50 having substantially identical shapes and sizes circumferentially and substantially evenly spaced from one another along a circular ring $C_A$, $C_B$, $C_A$, and $C_D$ of a different diameter, while basting projections 50 in one circular array may differ in size and/or shape from basting projections 50 in another circular array.

For instance, an innermost circular array of basting projections 50A is formed around a first circular ring $C_A$ concentrically positioned around a center of lid 14 spaced from perimeter 40. Opposing ends 66 and 68 of each basting projection 50A in the innermost circular array is positioned substantially directly on first circular ring $C_A$. Additionally referring to FIG. 10A, a width $W_A$ of each basting projection 50A is defined between its corresponding opposing ends 66 and 68 and a height H of each basting projection 50A is defined between its corresponding vertex 72 and interface with underside 36 (see FIGS. 3, 5, 8, and 9) along top interior line 62. Each of basting projections 50A is circumferentially spaced from other basting projections 50A in the innermost circular array with adjacent ones of basting projections 50A being spaced apart along circular ring $C_A$ a distance greater than a width $W_A$ of one of basting projections 50A. In one example, there are three or more basting projections 50A in the innermost array, and in one embodiment, there are eight basting projections 50A in the innermost array.

The second circular array includes basting projections 50B, which are formed in a similar cupped shaped as basting projections 50A other than differences specifically described herein. Basting projections 50B face center 38 of lid and are circumferentially spaced and formed around a second circular ring $C_B$, where second circular ring $C_B$ is concentric relative to and larger than first ring $C_A$. In one embodiment, a diameter of ring $C_B$ is about 150% the size of a diameter of circular ring $C_A$, while other size increases are also contemplated. For example, second circular ring $C_B$ has a diameter of between about 100 mm and about 106 mm, while first circular ring $C_A$ has a diameter of about 68 mm. In one embodiment, the larger the increase in size between adjacent circular rings $C_A$, $C_B$, $C_A$, and/or $C_D$, the larger the increase in widths of the corresponding basting projections 50A, 50B, 50C, and/or 50D, as further described below, to accommodate the larger surface area of underside 36 collecting condensate between the adjacent ones of circular rings $C_A$, $C_B$, $C_A$, and/or $C_D$.

In one embodiment, the height H (FIG. 6) each basting projection 50 extends from underside 36 to a corresponding vertex 72 is the same for all basting projections 50 including basting projections 50A, 50B, 50C, 50D, etc. as illustrated, for example, in the cross-sectional views of FIGS. 8 and 9. In one example, each basting projection 50 has a height H equal to more than about 3.5 mm, and in one example, equal to or greater than about 4.5 mm. In one embodiment, the center cross-section shape of all basting projections 50 is substantially identical to that shown in FIG. 6.

Figure 10A:
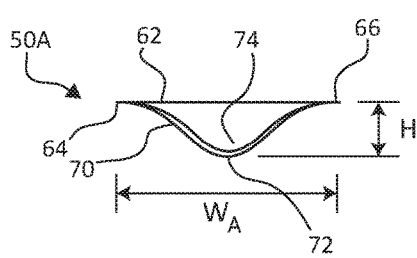
FIGS. 10A-10D is a series of illustrations looking into the various basting projections of FIG. 4, according to one embodiment of the present invention.
Figure 10B:
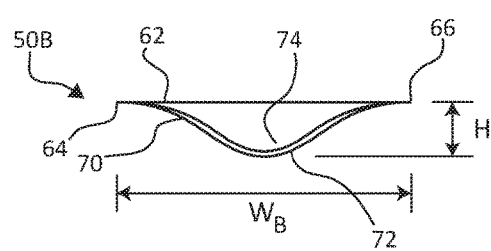
Figure 10C:
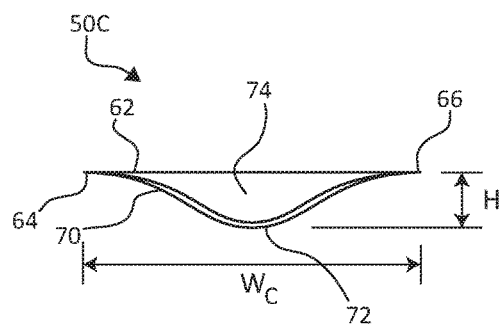
Figure 10D:
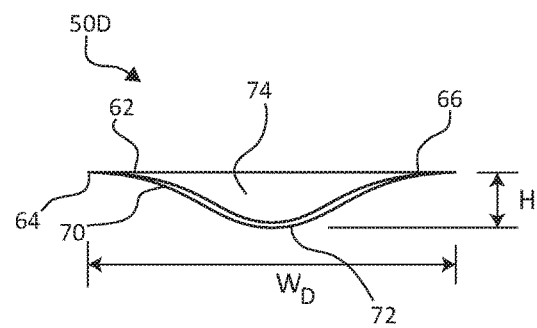

Additionally referring to FIGS. 10A and 10B, basting projections 50B each have a greater width $W_B$, defined between its corresponding opposing ends 66 and 68, than the width $W_A$ of each basting projection 50A, in one embodiment. The increasing width $W_B$ of basting projections 50B as compared to the width $W_A$ of basting projections 50A facilitates filling spatial gaps between basting projections 50A and accounts for increasing underside 36 area between adjacent circular rings $C_A$ and $C_B$, since an increased basting projection width corresponding to an increased surface area of interior surface 52 and size of bay 74 formed adjacent thereto. In one embodiment, widths $W_B$ of basting projections 50B are about at least about 10% greater than widths $W_A$ of basting projections 50A, and in one example are at least about 20% greater than widths $W_A$. For example, in one embodiment, width $W_A$ is equal to about 18 mm and width $W_B$ is equal to between about 22 mm and 24 mm, with other projection widths being contemplated. In one embodiment, the increase in widths of basting projections 50 in adjacent circular arrays is proportional to the increase in diameters between the corresponding adjacent circular rings the circular arrays are distributed around.

In one example, a number of basting projections 50A is less than or the same as a number of basting projections 50B, with each of basting projections 50B being positioned on a radial line between, for example, about half way between, two adjacent basting projections 50A, that is, circumferentially centered between two adjacent basting projections 50A. In this manner, as illustrated with reference to FIG. 4, condensate that is collected and/or moves between two adjacent basting projections 50A will generally be captured by larger basting projections 50B positioned radially outwardly and circumferentially between the two adjacent basting projections 50A as the condensate continues to slide down underside 36 toward perimeter 40 due to gravitational forces.

Figure 7:
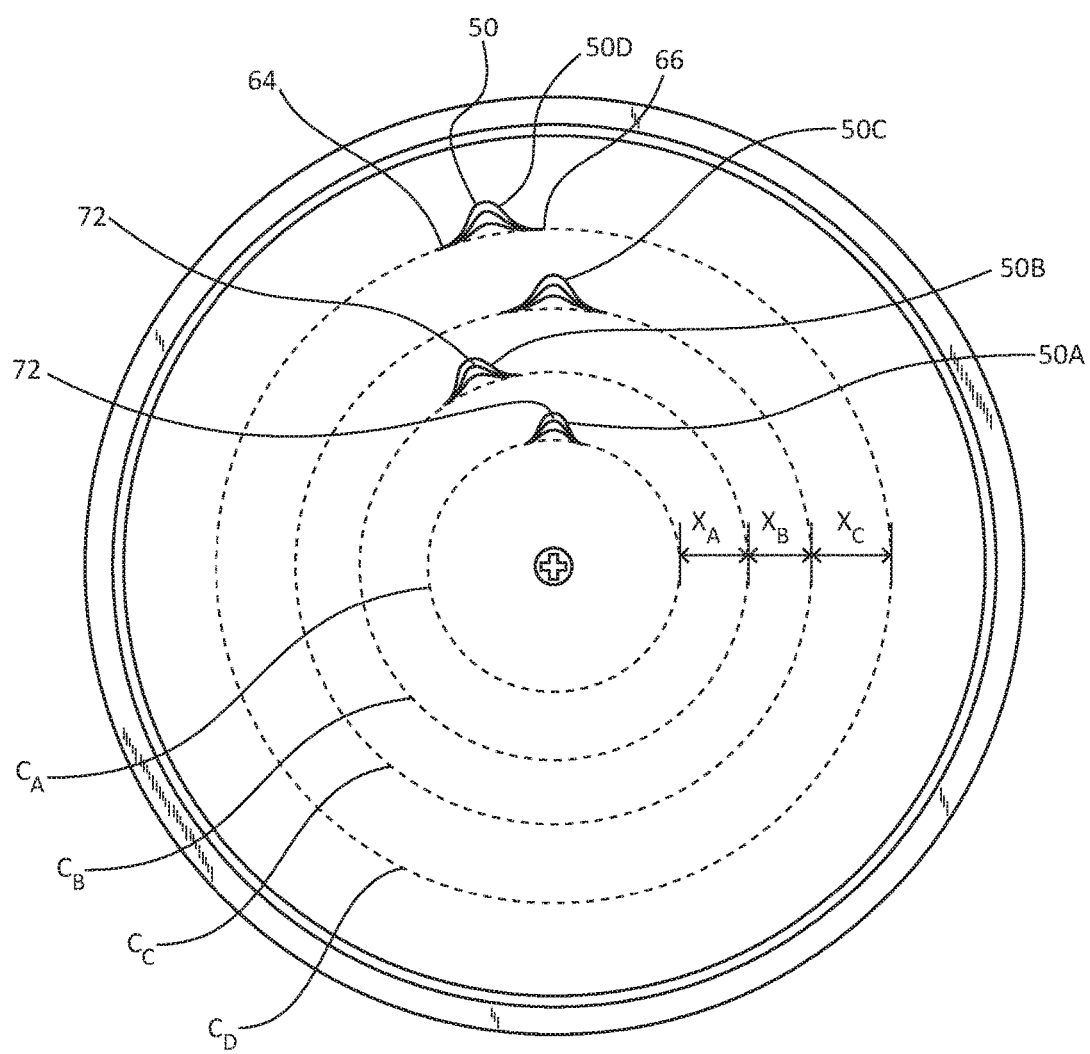
FIG. 7 is a bottom view illustration of the lid with basting projections removed for illustrative purposes, according to one embodiment of the present invention.

In a similar manner as described for basting projections 50A and 50B above, additional circular arrays of basting projections 50C and 50D are formed along additional circular rings $C_C$ and $C_D$ on underside 36 of lid 14 with each circular ring $C_C$ and $C_D$ increasing in size as they move from center 38 of lid 14 to perimeter 40 of lid 14. One example of a spacing of circular rings $C_A$, $C_B$, $C_C$, and $C_D$ is illustrated in FIG. 7, with a spacing distance $X_A$ being radially defined between circular rings $C_A$ and $C_B$, a spacing distance $X_B$ being radially defined between circular rings $C_B$ and $C_C$, and a spacing distance $X_C$ being radially defined between circular rings $C_C$ and $C_D$. In one embodiment spacing distances $X_A$, $X_B$, and $X_C$ are substantially equal to one another; while, in another embodiment, spacing distances increase as they move closer to perimeter 40 of lid 14. In one example, each of $X_A$, $X_B$, and $X_C$ are about 30% to about 50% of size of diameter of the innermost circular ring $C_A$, $C_B$, $C_C$, and $C_D$ directly adjacent thereto.

In one embodiment, additionally concentric circular arrays of basting projections are formed on increasingly larger and concentric circular rings $C_C$ and $C_D$, more specifically, including basting projections 50C and 50D, respectively. With each increasingly larger circular ring $C_C$ and $C_D$, the basting projections 50C and 50D, which are otherwise substantially identical to basting projections 50A and 50B, also increase in width. In this example, a width $W_C$ of individual basting projections 50C is larger than widths $W_A$ and $W_B$ of individual basting projections 50A and 50B, respectively, but is smaller than a width $W_D$ of an individual basting projection 50D to continue to accommodate increased condensate along underside 36 as underside 36 nears perimeter 40 of lid 14. In one example, a number of basting projections 50C is the same as or greater than the number of basting projections 50B or basting projections 50A, and a number of basting projections 50D is the same as or greater than the number of basting projections 50C. In one embodiment, the number of basting projections 50D is greater than the number of basting projections 50C such that part or all of more than one basting projection 50D are positioned between each set of adjacent basting projections 50C.

Figure 13:
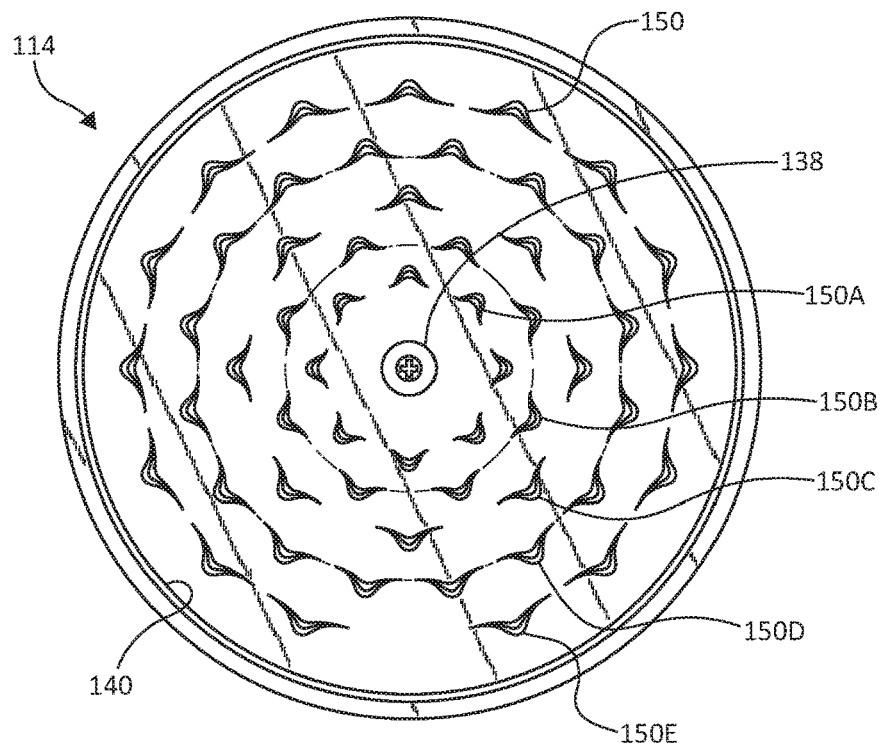
FIG. 13 is a bottom view illustration of the lid of FIG. 12, according to one embodiment of the present invention.
Figure 15:
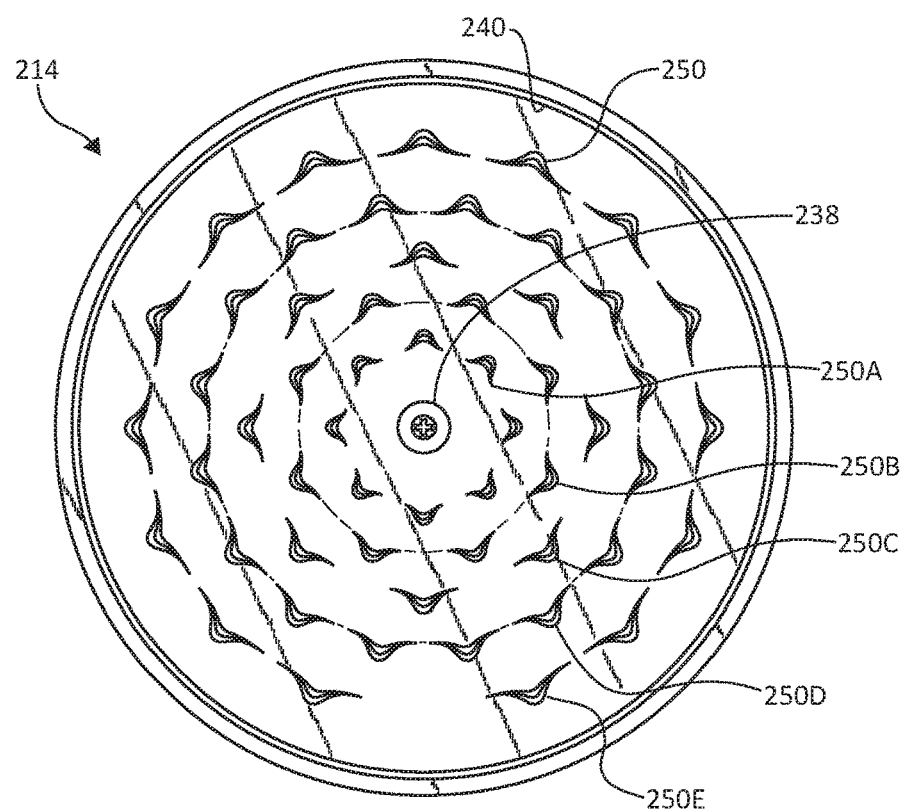
FIG. 15 is a bottom view illustration of the lid of FIG. 14, according to one embodiment of the present invention.

Depending upon the overall size of lid 14, the number of circular arrays of basting projections 50, the number of basting projections 50 in each array, and the spacing of basting projections 50 in each array will vary as illustrated, for example, when viewing FIGS. 4, 13, and 15 together. In each case as generally illustrated with arrows in FIG. 4, the number and positioning of basting projections 50 provides for collection of a portion the condensate from portions of underside 36 of lid 14 between center 38 and circular ring $C_A$ by an inner circle of basting projections 50A. Basting projections 50B collect a portion the condensate from portions of underside 36 of lid 14 between center 38 and circular ring $C_A$ that was not collected by basting projections 50A, that is, the portion of such condensate that moves between basting projections 50A, and a portion of the condensate from underside 36 between circular rings $C_A$ and $C_B$ collection of condensate. Similarly, basting projections 50C collect condensate sliding between basting projections 50B and/or formed on underside 36 outside of basting projections 50B, that is, on a perimeter or exterior side of circular ring $C_B$. Basting projections 50D collect condensate sliding between basting projections 50C and/or formed on underside 36 outside of basting projections 50C, that is, on a perimeter or exterior side of circular ring $C_C$.

Figure 11:
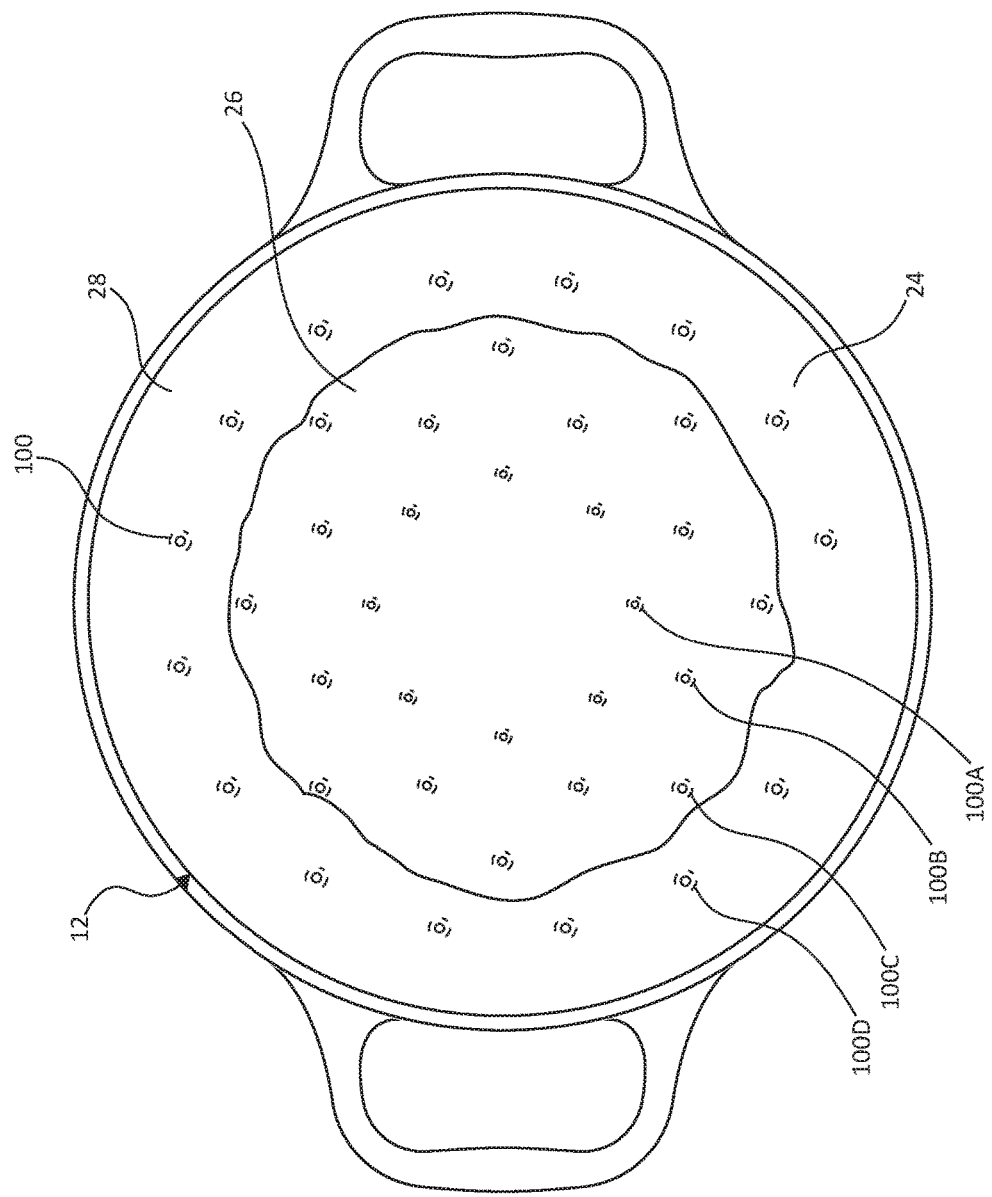
FIG. 11 is a top view illustration of the vessel, liquid, and item cooking therein during self-basting, according to one embodiment of the present invention.

While any condensate captured outside of circular ring $C_D$ will likely move to chamber 24 of vessel 12 along sidewall 22 thereof, the other condensate captured in one of basting projections 50 will eventually fall from vertices 72 as droplets 100 in a substantially evenly spaced manner as shown in FIG. 11. More specifically, as illustrated, droplets 100A, formed from condensate collected via corresponding basting projections 50A, each falls from vertex 72 of a corresponding one of basting projections 50A, droplets 100B each fall from vertex 72 of a corresponding one of basting projections 50B, droplets 100C each fall from vertex 72 of a corresponding one of basting projections 50C, and droplets 100D each fall from vertex 72 of a corresponding one of basting projections 50D. While droplets 100D may be spaced further apart from one another than droplets 100A, such droplets are generally larger in volume due to the increased size of basting projections 50D and bays 74 formed therein as compared to basting projections 50A, with similar theory informing the size and spacing of basting projections 50B and 50C and resultant droplets 100B and 100C therefrom. In this manner, food item 26 maintained in chamber 24 of vessel 12 during cooking is evenly basted or braised via droplets 100 providing a consistently prepared end product.

Figure 12:
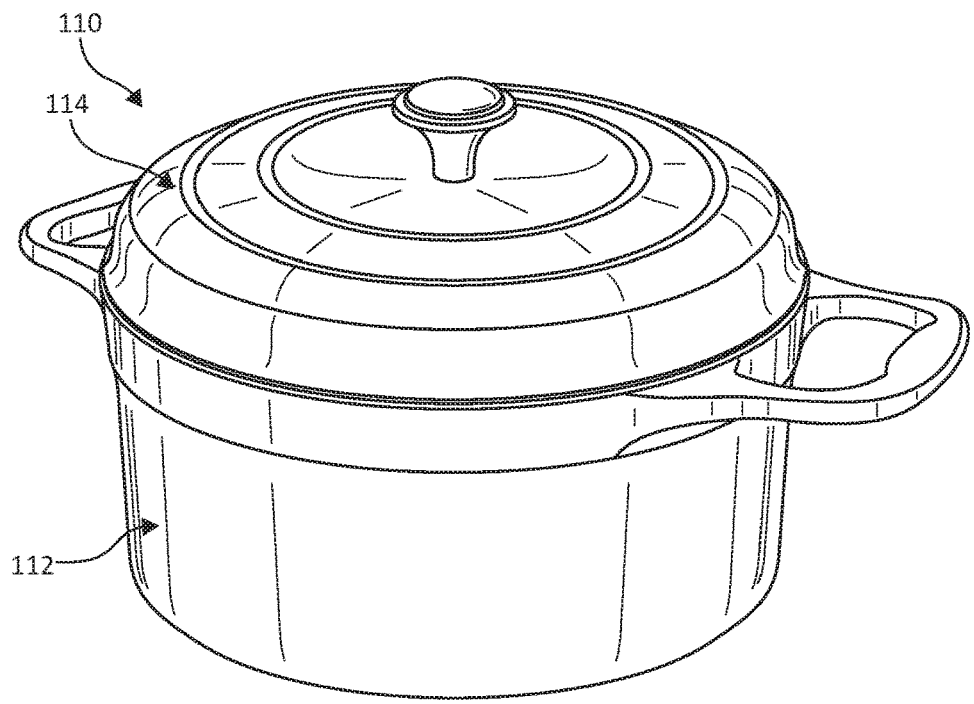
FIG. 12 is a front perspective view illustration of lid and vessel, according to one embodiment of the present invention.
Figure 14:
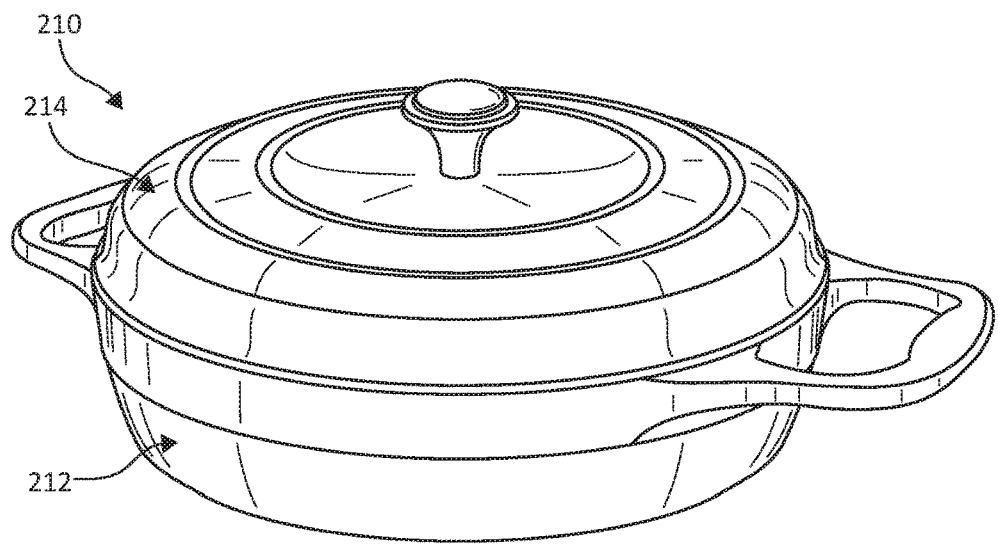
FIG. 14 is a front perspective view illustration of a lid and vessel, according to one embodiment of the present invention.

While cookware assembly 10 as described above provides embodiments of the present invention, other variations are also contemplated. For instance, one embodiment of cookware assembly 110, as illustrated in FIGS. 12 and 13, includes a larger vessel 112 and lid 114 than cookware assembly 10, and therefore lid 114 includes five circular arrays of basting projections 150A, 150B, 150C, 150D, and 150E extending around center 138 of lid 114 within perimeter 140 of lid 114 following similar structure as described above for basting projections 50 of cookware assembly 10. In one embodiment of cookware assembly 210, as illustrated in FIGS. 14 and 15, includes a differently shaped vessel 212 with a lid 214 similar to lid 114 including five circular arrays of basting projections 250A, 250B, 250C, 250D, and 250E extending around center 238 of lid 214 within perimeter 240 of lid 214 following similar structure as described above for basting projections 50 of cookware assembly 10.

Although the invention has been described with respect to particular embodiments, such embodiments are meant for illustrative purposes only and should not be considered to limit the invention. Various alternatives and changes will be apparent to those of ordinary skill in the art upon reading this application, including the shape or number of basting projections, number or spacing of circular arrays, etc. Other modifications within the scope of the invention and its various embodiments will be apparent to those of ordinary skill.

What is claimed is:

1. A cooking lid comprising:
   an underside having a center and extending toward a perimeter of the cooking lid; and
   a plurality of basting projections protruding downwardly from the underside of the cooking lid, each of the plurality of basting projections including:
   an interior concave surface facing the center of the cooking lid, extending downwardly away from the underside of the cooking lid to form a bay adjacent to the interior concave surface, and intersecting the underside of the cooking lid at a top interior line that extends along the underside of the cooking lid,
   an exterior surface facing the perimeter of the cooking lid, extending downwardly away from the underside of the cooking lid, and intersecting the underside of the cooking lid at a top exterior line that extends along the underside of the cooking lid, the top exterior line extending along the underside of the cooking cooking lid between the perimeter of the cooking lid and the top interior line, the top interior line extending along the underside of the cooking lid between the center of the cooking lid and the top exterior line, and the exterior surface and the interior concave surface defining a border therebetween and opposite the underside, and
   a drip ridge formed along the border between the interior concave surface and the exterior surface, the drip ridge defining a vertex at a point along the drip ridge positioned the farthest from the underside as compared to a remainder of the drip ridge.

2. The cooking lid of claim 1, wherein the drip ridge of each one of the plurality of basting projections has two opposing ends adjacent the underside of the cooking lid, the drip ridge extends between the two opposing ends with a parabolic shape.

3. The cooking lid of claim 2, wherein the vertex of each one of the plurality of basting projections is located farther away from the center of the underside of the cooking lid than each of the two opposing ends of the corresponding one of the plurality of basting projections are located relative to the center of the underside of the cooking lid.

4. The cooking lid of claim 1, wherein the vertex defines a discrete lowermost and radially outermost point of the interior concave surface relative to the underside of the cooking lid.

5. The cooking lid of claim 4, wherein each one of the plurality of basting projections is solid between the interior concave surface and the exterior surface.

6. The cooking lid of claim 1, wherein:
   the plurality of basting projections are arranged in at least two circular arrays with each of the at least two circular arrays being distributed around a different one of at least two circular rings,
   the at least two circular rings are concentric with one another about the center of the underside and include a smaller circular ring and a larger circular ring, and
   ones of the plurality of basting projections distributed around the smaller circular ring have a smaller width than other ones of the plurality of basting projections that are distributed around the larger circular ring.

7. The cooking lid of claim 6, wherein the smaller width is at least about 10% smaller than the larger width.

8. The cooking lid of claim 6, wherein all of the plurality of basting projections have substantially identical overall depths as measured between the interior concave surface and the exterior surface of each of the plurality of basting projections.

9. The cooking lid of claim 6, wherein all of the plurality of basting projections extend a substantially identical height away from the underside.

10. The cooking lid of claim 6, wherein each of the other ones of the plurality of basting projections that are distributed around the larger one of the at least two circular rings are positioned circumferentially between two adjacent ones of the plurality of basting projections distributed around a smaller one of the at least two circular rings.

11. The cooking lid of claim 1, wherein the interior concave surface faces and bows away from the center of the underside.

12. The cooking lid of claim 1, wherein the exterior surface is convex bowing toward the perimeter.

13. The cooking lid of claim 1, wherein a depth of each one of the plurality of basting projections tapers from the underside to the vertex.

14. The cooking lid of claim 1, wherein the top interior line has a curvature bowing outwardly toward the perimeter of the cooking lid, and the top interior line is inset closer to the center of the underside than the vertex of the corresponding one of the plurality of basting projections.

15. The cooking lid of claim 1, wherein during use of the cooking lid, condensate formed on the underside collects along the interior concave surface, which funnels the condensate to the vertex for droplet formation and release from a corresponding one of the plurality of basting projections.

16. A cooking lid comprising:
   an underside having a center and extending toward a perimeter of the cooking lid; and
   a plurality of basting projections arranged in at least two circular arrays, each of the plurality of basting projections comprising:
   an interior concave surface facing the center of the cooking lid and intersecting the underside of the cooking lid at a top interior line that extends along the underside of the cooking lid;
   a bay adjacent to the interior concave surface;
   an exterior surface facing the perimeter of the cooking lid and intersecting the underside of the cooking lid at a top exterior line that extends along the underside of the cooking lid, the top exterior line extending along the underside of the cooking lid between the perimeter of the cooking lid and the top interior line, and the top interior line extending along the underside of the cooking lid between the center of the cooking lid and the top exterior line; and
   a drip ridge formed along a border between the interior concave surface and the exterior surface, the drip ridge comprising:
   two opposing ends adjacent the underside of the cooking lid; and
   a vertex at a point along the drip ridge positioned the farthest from the underside as compared to a remainder of the drip ridge;
   wherein the drip ridge extends between the two opposing ends with a parabolic shape;

wherein the vertex defines a discrete lowermost point of the interior concave surface relative to the underside of the cooking lid; and wherein at least one of the at least two circular arrays are distributed around a different one of at least two circular rings, and the at least two circular rings are concentric with one another about the center of the underside.

17. The cooking lid of claim 16, wherein during use of the cooking lid, condensate formed on the underside collects along the interior concave surface, which funnels the condensate to the vertex for droplet formation and release from a corresponding one of the plurality of basting projections.

18. The cooking lid of claim 16, wherein the vertex defines a radially outermost point of the interior concave surface relative to the underside of the cooking lid.

* * * * *

UNITED STATES PATENT AND TRADEMARK OFFICE
CERTIFICATE OF CORRECTION

PATENT NO. : 10,264,921 B2  
APPLICATION NO. : 14/978012  
DATED : April 23, 2019  
INVENTOR(S) : Timothy J. Bennett Page 1 of 1

It is certified that error appears in the above-identified patent and that said Letters Patent is hereby corrected as shown below:

In the Claims

In Column 9, Claim 1, Line 28, "cooking cooking" should be -- cooking --.

Signed and Sealed this
Ninth Day of July, 2019

Andrei Iancu
*Director of the United States Patent and Trademark Office*